United States Patent Office 3,062,898
Patented Nov. 6, 1962

3,062,898
PREPARATION OF 1,2,3,4,5,6,7,7-OCTACHLORO-2-METHYLBICYCLO-(2.2.1)-HEPTENE-5
Paul E. Hoch, Youngstown, N.Y., assignor to Hooker Chemical Corporation, Niagara Falls, N.Y., a corporation of New York
No Drawing. Filed May 8, 1959, Ser. No. 811,781
2 Claims. (Cl. 260—648)

This invention relates to a novel insecticidal composition and to novel reactions for preparing same. As disclosed and claimed in copending application Serial Number 811,792, filed of even date herewith, hexachlorocyclopentadiene may be reacted with methyl acetylene to yield

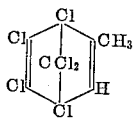

1,4,5,6,7,7 - hexachloro - 2 - methylbicyclo - (2.2.1) - heptadiene-2,5. It is a finding of this invention that this material in turn may be chlorinated to yield

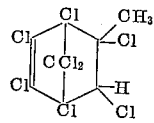

1,2,3,4,5,6,7,7 - octachloro - 2 - methylbicyclo - (2.2.1) - heptene-5, a new composition of matter. It is yet another finding of this invention that this latter material is a useful insecticide.

The equations for the foregoing reactions are as follows:

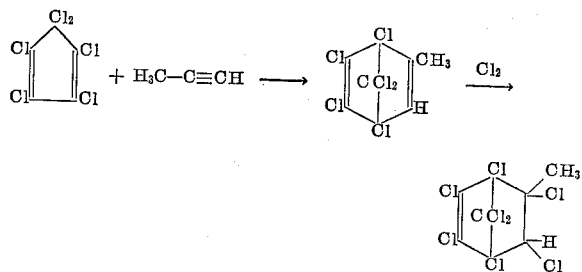

The invention is further illustrated by the following examples and disclosure.

EXAMPLE 1.—THE PREPARATION OF 1,4,5,6,7,7-HEXACHLORO - 2 - METHYLBICYCLO - (2.2.1) - HEPTADIENE-2,5

Into 800 grams of hexachlorocyclopentadiene, stirred and heated to 190 to 200 degrees centigrade was passed a mixture of 70 percent methyl acetylene and 30 percent allene. After twelve hours the hexachlorocyclopentadiene was stripped under vacuum and the residue distilled. The pale yellow oil obtained had a boiling point of 70 to 71 degrees centigrade at 0.1 millimeter pressure. Chlorine analysis calculated for $C_8H_4Cl_6$: Theory 68.4%; found 68.2%. $n_D^{25°}$ 1.5550.

EXAMPLE 2.—THE PREPARATION OF 1,2,3,4,5,6,7,7 - OCTACHLORO - 2 - METHYLBICYCLO-(2.2.1)-HEPTENE-5

Into 10 grams of the product of Example 1 in a test tube exposed to ultraviolet light from a General Electric H-I lamp at 50 to 60 degrees centigrade was passed chlorine gas until one mol equivalent or 1.9 grams of chlorine was absorbed. The mushy solid obtained was recrystallized from ethanol as colorless crystals. The product obtained had a melting point of 150 to 151 degrees centigrade. Chlorine analysis calculated for $C_8H_4Cl_8$: Theory 74.0%; found 74.3%.

Each of the materials of Examples 1 and 2 were tested for their insecticidal activity. It was found that the material of Example 2 was insecticidally active while the material of Example 1 was not. It is readily apparent, however, that this material possesses utility in the preparation of the the product of Example 2. The insecticidal activity of the product of Example 2 is demonstrated by the following:

Insecticidal Test Data

| Concentration, percent | Housefly, percent kill | Mexican bean beetle, percent kill | Pea aphid, percent kill |
|---|---|---|---|
| 1.0 | 100 | | |
| 0.1 | 50–80 | 50 | 50–80 |

The compound of Example 2 is capable of being diluted with a solvent, such as benzene, to form solutions or dispersions which are effective against insects. This new insecticide may be applied in any of the conventional methods. Thus, for example, it may be used in an aqueous emulsion, or it may also be incorporated in organic liquids such as the aromatic hydrocarbons for spraying purposes. It may be effectively used in dusts with such inert solid diluents as kieselguhr, wood flour, walnut shell, talc and the like.

In obtaining the foregoing insecticidal test data, water emulsions or water suspensions were used with benzene as a solvent and with Triton X–100 (an alkyl aryl polyether alcohol manufactured by the Rohm and Haas Company) as an emulsifier. A Waters vertical spray tower was used. In this procedure a spray is injected through a glass atomizer into an eight inch stainless steel cylinder to test insects forty-four inches below the nozzle. The samples were made at one percent and 0.1 percent dilution.

In testing the activity against houseflies, fifty flies of the strain of the Chemical Specialties Manufacturer Association were placed in a two inch by five inch stainless steel cage faced on top and bottom with fourteen mesh screen. The flies were retained in the cage for knockdown observations and for mortality determination after twenty-four hours.

In testing the activity against Mexican bean bettles, Lima bean leaves were sprayed on their dorsal and ventral surfaces and offered to ten larvae of the Mexican bean beetle for a forty-eight hour period.

In testing the activity against pea aphids, the pea aphids were sprayed and transferred to sprayed pea plants and retained there for forty-eight hours for mortality determination.

The compound of Example 1 can be prepared by passing methyl acetylene at atmospheric pressure into hexachlorocyclopentadiene at elevated temperatures, preferably between 140 and 200 degrees centigrade or by carrying out the reaction under pressure.

The chlorination reaction of Example 2 is carried out by passing gaseous chlorine into the compound of Example 1 under irradiation by an ultraviolet light source and preferably at a temperature between 30 to 60 degrees centigrade.

The compound of the present invention may also be used in the preparation of polymers which are, due to the high chlorine content, flame retardant in nature. The compound of the present invention may also be used as a flameproofing agent. In addition, the compound of the present invention finds utility as a chemical intermediate.

I claim:
1. The process for preparing 1,2,3,4,5,6,7,7-octachloro-2-methylbicyclo-(2.2.1)-heptene-5 which comprises reacting hexachlorocyclopentadiene with methyl acetylene to yield 1,4,5,6,7,7-hexachloro-2-methylbicyclo-(2.2.1)-heptadiene-2,5, and chlorinating the resulting heptadiene to yield 1,2,3,4,5,6,7,7 - octachloro - 2 - methylbicyclo-(2.2.1)-heptene-5.
2. The process of preparing 1,2,3,4,5,6,7,7-octachloro-2-methylbicyclo-(2.2.1)-heptene-5 which comprises chlorinating 1,4,5,6,7,7 - hexachloro-2-methylbicyclo-(2.2.1)-heptadiene-2,5.

References Cited in the file of this patent

UNITED STATES PATENTS

| | | | |
|---|---|---|---|
| 2,314,846 | McClellan | Mar. 23, | 1943 |
| 2,382,037 | Bruson | Aug. 14, | 1945 |
| 2,671,043 | Gilbert | Mar. 2, | 1954 |
| 2,777,794 | Kenaga | Jan. 15, | 1957 |
| 2,802,862 | Senkbeil | Aug. 13, | 1957 |
| 2,841,484 | Johnson | July 1, | 1958 |
| 2,841,485 | Johnson | July 1, | 1958 |
| 2,881,223 | Schmerling | Apr. 7, | 1959 |
| 2,912,356 | Schmerling | Nov. 10, | 1959 |